US012503808B2

(12) United States Patent
Damtew

(10) Patent No.: US 12,503,808 B2
(45) Date of Patent: Dec. 23, 2025

(54) WATER JET SYSTEM FOR A WASHING MACHINE APPLIANCE

(71) Applicant: Haier US Appliance Solutions, Inc., Wilmington, DE (US)

(72) Inventor: Fikreadam Abebe Damtew, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 154 days.

(21) Appl. No.: 18/489,553

(22) Filed: Oct. 18, 2023

(65) Prior Publication Data

US 2025/0129538 A1 Apr. 24, 2025

(51) Int. Cl.
*D06F 39/08* (2006.01)
*D06F 23/02* (2006.01)
*D06F 39/02* (2006.01)
*B05B 1/30* (2006.01)
*F16K 11/10* (2006.01)

(52) U.S. Cl.
CPC ............ *D06F 39/088* (2013.01); *D06F 23/02* (2013.01); *D06F 39/028* (2013.01); *B05B 1/3013* (2013.01); *F16K 11/10* (2013.01)

(58) Field of Classification Search
CPC ....... D06F 23/02; D06F 39/028; D06F 39/088
See application file for complete search history.

(56) References Cited

U.S. PATENT DOCUMENTS 8,448,480 B2 * 5/2013 Hasse .................. D06F 39/022 68/17 R
9,435,066 B2 9/2016 Yik et al.
10,422,073 B2 9/2019 Cinello
10,494,753 B2 12/2019 Leibman
(Continued)

FOREIGN PATENT DOCUMENTS

CN 2378419 Y 5/2000
CN 102345224 A * 2/2012 ........... D06F 39/028
(Continued)

OTHER PUBLICATIONS

Machine translation of CN 102345224 A to Seo. (Year: 2012).*
Machine translation of EP 2438334 B1 to Da Pont. (Year: 2017).*

*Primary Examiner* — Joseph L. Perrin
(74) *Attorney, Agent, or Firm* — Dority & Manning, P.A.

(57) ABSTRACT

A washing machine appliance may include a cabinet and a tub positioned in the cabinet. The washing machine appliance may include a flow channel manifold positioned within the cabinet and upstream of the tub. The flow channel manifold may include a plurality of water jet nozzles and a plurality of fluid-parallel flow channels. The plurality of fluid-parallel flow channels may be in downstream fluid communication with the plurality of water jet nozzles. The washing machine appliance may also include a water valve manifold. The water valve manifold may include a plurality of fluid-parallel water valves. Each water valve of the plurality of fluid-parallel water valves may be configured to selectively direct water to the plurality of water jet nozzles.
(Continued)

Each water valve of the plurality of fluid-parallel water valves may be in upstream fluid communication with a discrete water jet of the plurality of water jet nozzles.

18 Claims, 5 Drawing Sheets

(56) References Cited

U.S. PATENT DOCUMENTS

| | | | | |
|---|---|---|---|---|
| 2005/0229652 | A1* | 10/2005 | Kim | D06F 39/028 68/237 |
| 2005/0241072 | A1* | 11/2005 | Kim | D06F 39/088 68/3 R |
| 2005/0241347 | A1* | 11/2005 | Cho | D06F 39/02 510/225 |
| 2005/0262881 | A1* | 12/2005 | Rizzetto | D06F 39/028 68/3 R |
| 2005/0274156 | A1* | 12/2005 | Yang | D06F 39/028 68/17 R |
| 2012/0060568 | A1* | 3/2012 | Buso | D06F 39/088 68/17 R |
| 2012/0067089 | A1* | 3/2012 | Buso | D06F 39/02 68/17 R |
| 2017/0350060 | A1* | 12/2017 | Favaro | D06F 39/028 |
| 2019/0368108 | A1* | 12/2019 | Channal | D06F 34/04 |
| 2020/0087839 | A1* | 3/2020 | White | D06F 33/43 |
| 2020/0216996 | A1* | 7/2020 | Del Pos | D06F 39/028 |
| 2021/0254258 | A1* | 8/2021 | Damtew | D06F 39/02 |
| 2022/0003587 | A1 | 1/2022 | Braunschweig et al. | |
| 2022/0018050 | A1* | 1/2022 | Bernardino | D06F 34/28 |

FOREIGN PATENT DOCUMENTS

| | | | | |
|---|---|---|---|---|
| CN | 112301668 | B | 7/2022 | |
| EP | 2438334 | B1 * | 3/2017 | D06F 39/088 |
| GB | 2353540 | A | 2/2001 | |
| WO | WO2015063005 | A1 | 5/2015 | |

* cited by examiner

WATER JET SYSTEM FOR A WASHING MACHINE APPLIANCE

FIELD OF THE DISCLOSURE

The present subject matter relates generally to a jet system for directing water, such as in a washing machine appliance.

BACKGROUND OF THE DISCLOSURE

Washing machine appliances generally include a tub for containing water or wash fluid, e.g., water and detergent, bleach, or other wash additives. A basket is rotatably mounted within the tub and defines a wash chamber for receipt of articles for washing. During normal operation of such washing machine appliances, the wash fluid is directed into the tub and onto articles within the wash chamber of the basket. The basket or an agitator can rotate at various speeds to agitate articles within the wash chamber, to wring wash fluid from articles within the wash chamber, etc. During a spin or drain cycle of a washing machine appliance, a drain pump assembly may operate to discharge water from within a sump.

Often, washing machine appliances include dispensers that are configured to dispense water or wash fluids into the tub. Many washing machine appliances include additive dispensers that have multiple additive chambers for housing additives therein. Typically, washing machine appliances include water jet systems that are configured to provide clean water to each additive chamber, e.g., to flush the additive chamber. For instance, conventional water jet systems commonly include two water valves that selectively direct a flow of clean water to each additive chamber. However, further improvements are necessary to increase the functionality of water jet systems.

Accordingly, a washing machine appliance that includes one or more features to increase the functionality of a water jet system of a washing machine appliance would be useful.

BRIEF DESCRIPTION OF THE DISCLOSURE

Aspects and advantages of the invention will be set forth in part in the following description, or may be obvious from the description, or may be learned through practice of the invention.

In one exemplary aspect of the present disclosure, a washing machine appliance is provided. The washing machine may include a cabinet. The washing machine appliance may also include a tub positioned in the cabinet. The washing machine appliance may further include a flow channel manifold positioned within the cabinet and upstream of the tub. The flow channel manifold may include a plurality of water jet nozzles and a plurality of fluid-parallel flow channels. The plurality of fluid-parallel flow channels may be in downstream fluid communication with the plurality of water jet nozzles. The plurality of water jet nozzles may include a first water jet nozzle, a second water jet nozzle, a third water jet nozzle, and a fourth water jet nozzle. The plurality of fluid-parallel flow channels may include a first flow channel, a second flow channel, a third flow channel, a fourth flow channel, a fifth flow channel, and a sixth flow channel. The washing machine appliance may also include a water valve manifold. The water valve manifold may include a plurality of fluid-parallel water valves to selectively direct water to the plurality of water jet nozzles. The plurality of fluid-parallel water valves may include a first water valve in upstream fluid communication with the first water jet nozzle, a second water valve in upstream fluid communication with the third water jet nozzle, and a third water valve in upstream fluid communication with the second water jet nozzle and the fourth water jet nozzle.

In another exemplary aspect of the present disclosure, a washing machine appliance is provided. The washing machine appliance may include a cabinet. The washing machine appliance may also include a tub positioned in the cabinet. The washing machine appliance may further include a flow channel manifold positioned within the cabinet and upstream of the tub. The flow channel manifold may include a plurality of water jet nozzles and a plurality of fluid-parallel flow channels. The plurality of fluid-parallel flow channels may be in downstream fluid communication with the plurality of water jet nozzles. The washing machine appliance may also include a water valve manifold. The water valve manifold may include a plurality of fluid-parallel water valves. Each water valve of the plurality of fluid-parallel water valves may be configured to selectively direct water to the plurality of water jet nozzles. Each water valve of the plurality of fluid-parallel water valves may be in upstream fluid communication with a discrete water jet of the plurality of water jet nozzles.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
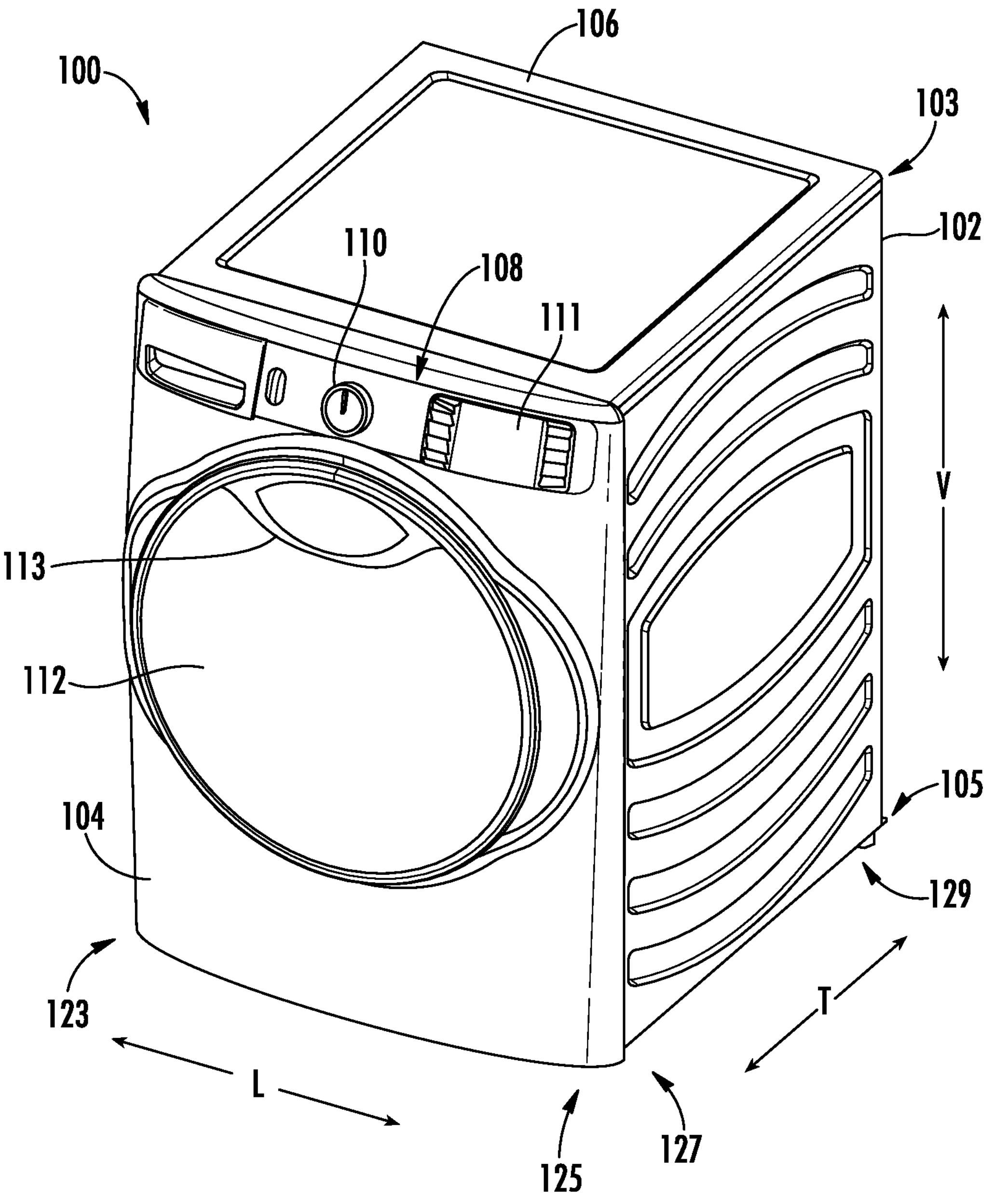
FIG. 1 provides a perspective view of a washing machine appliance according to one or more exemplary embodiments of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). The term "at least one of" in the context of, e.g., "at least one of A, B, and C" refers to only A, only B, only C, or any combination of A, B, and C. In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

The terms "wash fluid" and the like may be used herein to generally refer to a liquid used for washing or rinsing clothing or other articles. For example, the wash fluid is typically made up of water that may include other additives such as detergent, fabric softener, bleach, or other suitable treatments (including combinations thereof).

As used herein, the terms "clothing," "articles," and the like may include but need not be limited to fabrics, textiles, garments, linens, papers, or other items which may be cleaned, dried, or otherwise treated in a laundry appliance. Furthermore, the terms "load" or "laundry load" refers to the combination of clothing that may be washed together in a washing machine or dried together in a dryer appliance and may include a mixture of different or similar articles of clothing of different or similar types and kinds of fabrics, textiles, garments and linens within a particular laundering process.

Figure 2:
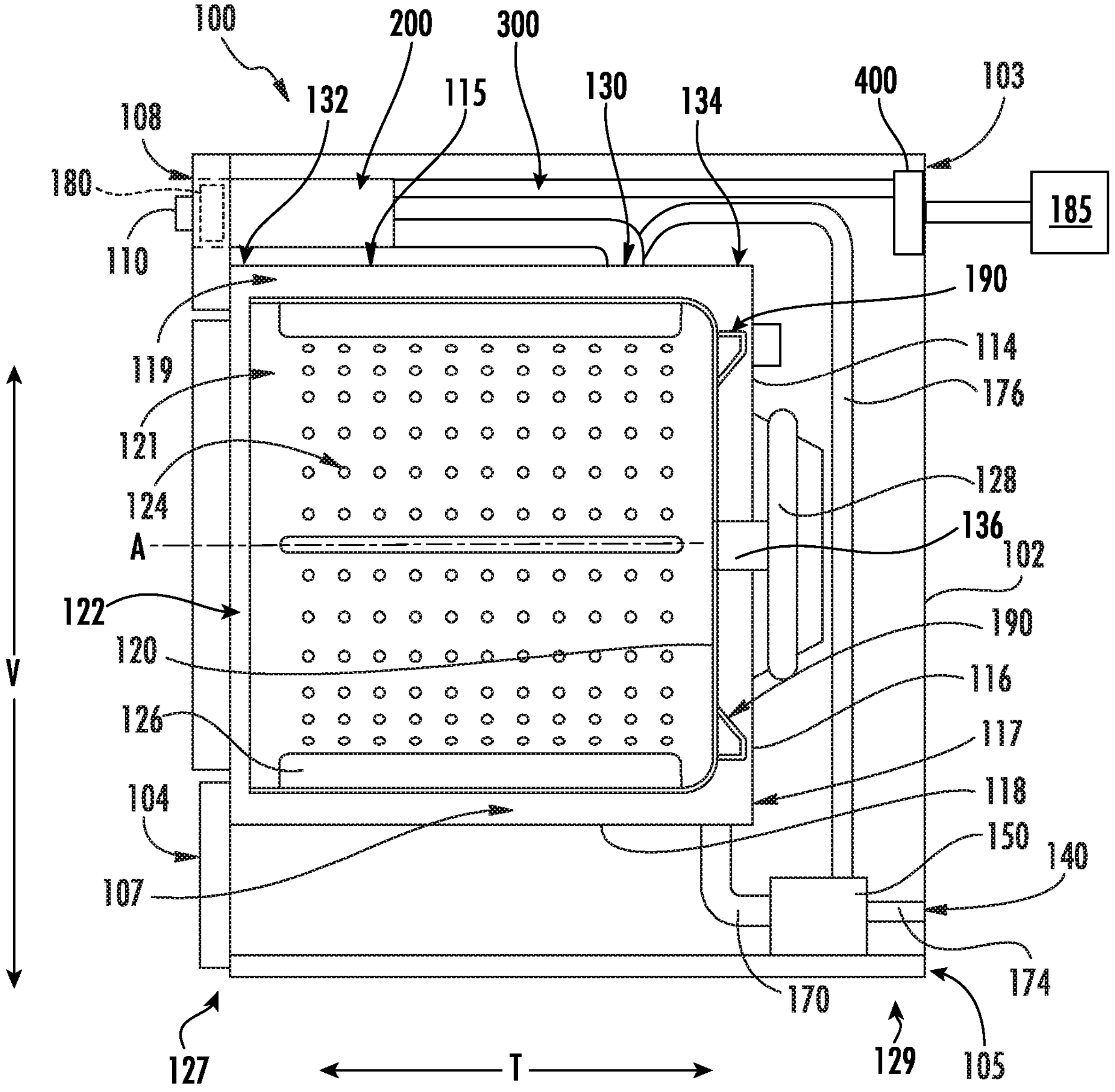
FIG. 2 provides a side, cross-sectional view of the exemplary washing machine appliance of FIG. 1

Referring now to the figures, a washing machine appliance 100 will be described according to one or more exemplary embodiments of the present subject matter. FIGS. 1 and 2 provide various views of the washing machine appliance 100 according to one or more exemplary aspects of the present subject matter. In particular, FIG. 1 provides a front, perspective view of the washing machine appliance 100 and FIG. 2 provides a side, section view of washing machine appliance 100. As shown in FIG. 1, washing machine appliance 100 defines a vertical direction V, a lateral direction L, and a transverse direction T. The vertical direction V, the lateral direction L, and transverse direction T may be mutually perpendicular as to define an orthogonal direction system.

The washing machine appliance 100 may generally include a cabinet 102. In some embodiments, the cabinet 102 extends between a top 103 and a bottom 105, approximately along the vertical direction V. In addition, in some embodiments, cabinet 102 extends between a first side 123 and a second side 125 approximately along the lateral direction L. Further, in some embodiments, the cabinet 102 extends between a front 127 and a rear 129 approximately along the transverse direction T.

In some embodiments, cabinet 102 includes a front panel 104. The cabinet may include a door 112 that may be mounted to front panel 104. For instance, the door 112 may be rotatably mounted to the front panel 104 such that the door 112 may be transitionable between an open position (not shown) wherein access to a wash drum or basket 120 (see e.g., FIG. 2) located within cabinet 102 is facilitated, and a closed position (see e.g., FIGS. 1 and 2) wherein access to basket 120 is hindered. A user may pull on a handle 113 in order to selectively adjust door 112 between the open and closed positions. Further, cabinet 102 may also include a top panel 106 positioned at top 103 of cabinet 102.

In some embodiments, the washing machine appliance 100 includes a control panel 108 that is coupled to the front panel 104. The control panel 108 may include a plurality of input selectors 110. Control panel 108 and input selectors 110 may collectively form a user interface input for operator selection of machine cycles and features. In some embodiments, e.g., as shown in FIG. 1, the control panel 108 includes a display 111 configured to present or indicate selected features, a countdown timer, or other items of interest to machine users.

Operation of washing machine appliance 100 is controlled by a processing device or controller 180 that is operatively coupled to control panel 108 for user manipulation (e.g., to select washing cycles and features). For instance, in response to user manipulation of control panel 108, controller 180 operates the various components of washing machine appliance 100 to execute selected machine cycles and features, which will be described in further detail herein.

Controller 180 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 180 may be constructed without using a microprocessor, e.g., using a combination of discrete analog or digital logic circuitry (such as switches, amplifiers, integrators, comparators, flip-flops, gates, and the like) to perform control functionality instead of relying upon software. Control panel 108 and other components of washing machine appliance 100 may be in communication with controller 180 via one or more signal lines or shared communication busses.

As shown in FIG. 2, a tub 114 defines a wash fluid compartment 119 configured for receipt of a wash fluid. Thus, tub 114 is configured for containing wash fluids, e.g., during operation of washing machine appliance 100. In some embodiments, the tub 114 includes a back wall 116 and a sidewall 118. Additionally, in some embodiments, the tub 114 extends between a top 115 and a bottom 117 approximately along the vertical direction V. Further, in some embodiments, the tub 114 extends between a front 132 and a rear 134 approximately along the transverse direction T.

In some embodiments, the basket 120 is rotatably mounted within tub 114 in a spaced apart relationship from tub sidewall 118 and tub back wall 116. One or more bearing assemblies may be placed between basket 120 and tub 114 to allow for rotational movement of basket 120 relative to tub 114. In some embodiments, the basket 120 defines a wash chamber 121 and an opening 122. Opening 122 of basket 120 may permit access to wash chamber 121 of basket 120, e.g., in order to load articles into basket 120 and remove articles from basket 120. Basket 120 also defines a plurality of perforations 124 that are provided to facilitate fluid communication between an interior of basket 120 and tub 114. In some embodiments, a sump 107 is defined by tub 114 and is configured for receipt of wash fluid during operation of washing machine appliance 100. For example, during operation of washing machine appliance 100, wash fluid may be urged by gravity from basket 120 to sump 107 through the plurality of perforations 124.

A spout 130 is configured for directing a flow of wash fluid into tub 114. Spout 130 may be in fluid communication with a water jet system (e.g., water jet system 250 or 450 described in more detail below) in order to direct a wash fluid into tub 114. A pump assembly 150 (shown schematically in FIG. 2) is located beneath tub 114 for draining wash fluid from the tub 114. Pump assembly 150 is in fluid communication with sump 107 of tub 114 via a conduit 170. Thus, conduit 170 directs fluid from tub 114 to pump assembly 150. Pump assembly 150 is also in fluid communication with a drain 140 via piping 174. Pump assembly 150 can urge fluid disposed in sump 107 to drain 140 during operation of washing machine appliance 100 in order to remove fluid from tub 114. Fluid received by drain 140 from pump assembly 150 is directed out of washing machine appliance 100, e.g., to a sewer or septic system.

In addition, pump assembly 150 is configured for recirculating washing fluid within tub 114. Thus, pump assembly 150 is configured for urging fluid from sump 107, e.g., to spout 130. For example, pump assembly 150 may urge washing fluid in sump 107 to spout 130 via hose 176 during operation of washing machine appliance 100 in order to assist in cleaning articles disposed in basket 120. It should be understood that conduit 170, piping 174, and hose 176 may be constructed of any suitable mechanism for directing fluid, e.g., a pipe, duct, conduit, hose, or tube, and are not limited to any particular type of mechanism.

A motor 128 is in mechanical communication with basket 120 in order to selectively rotate basket 120, e.g., during an agitation or a rinse cycle of washing machine appliance 100 as described below. In particular, a shaft 136 mechanically couples motor 128 with basket 120 and drivingly rotates basket 120 about a shaft or central axis A, e.g., during a spin cycle. Ribs 126 may extend from basket 120 into wash chamber 121. Ribs 126 may assist agitation of articles disposed within wash chamber 121 during operation of washing machine appliance 100. For example, ribs 126 may lift articles disposed in basket 120 during rotation of basket 120.

Also shown in FIG. 2 is a balancing apparatus 190. Balancing apparatus 190 can include a balancing ring, for example. The balancing ring can have an annular cavity in which a balancing material is free to rotate and move about. For example, the balancing material can be a fluid such as water or can be balancing balls. The balancing ring can include one or more interior baffles. Although a single balancing ring or apparatus 190 is shown in FIG. 2, any number of such rings or apparatuses can be included in washing machine appliance 100 and can be placed according to any known or desirable configuration. For example, two balancing rings can be respectively placed at the front and back of basket 120.

As further shown schematically in FIG. 2, washing machine appliance 100 includes an additive dispenser 200 for the dispensing of additives, e.g., detergent, bleach, fabric softener, liquid rinse sanitizer, etc. For instance, the additive dispenser 200 may generally include one or more additive chambers for receiving various additives. Additionally, each additive chamber may include features for dispensing or directing the additives to wash fluid compartment 119 of tub 114 during operation of washing machine appliance 100.

Figure 3:
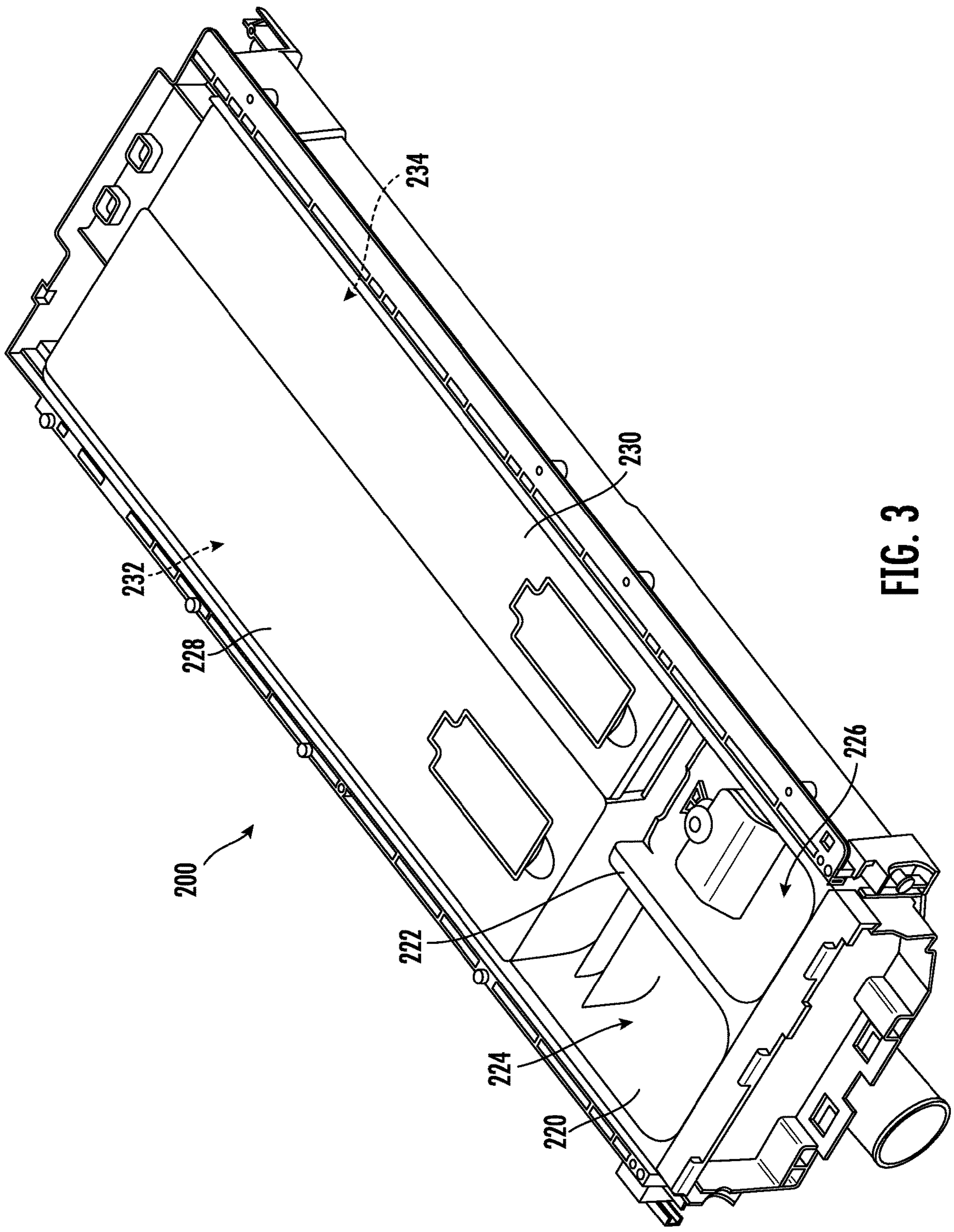
FIG. 3 provides a perspective view of an additive dispenser according to one or more exemplary embodiments of the present subject matter.

For example, referring now to FIG. 3, a perspective view of the exemplary additive dispenser 200 according to one or more exemplary embodiments of the present subject matter is provided. In some embodiments, the additive dispenser 200 is slidably mounted to the washing machine appliance 100. For instance, the additive dispenser 200 may be slidable between an open position and a closed position. In the open position, the additive dispenser 200 may be at least partially withdrawn from the washing machine appliance 100 so that a user may readily access the one or more additive chambers defined within the additive dispenser 200. In the closed position, additive dispenser 200 may be received within the washing machine appliance 100 so that one or more of the additive compartments of additive dispenser 200 are in fluid communication between a water jet system (e.g., water jet system 250 or water jet system 450 as will be described in more detail below) and the tub 114. More particularly, the additive dispenser 200 may be in direct fluid communication between a flow channel manifold 300 (e.g., as will be described in more detail below) of the water jet system and the tub 114 during operation of washing machine appliance 100.

As illustrated in FIG. 3, the additive dispenser 200 may include an additive compartment 220. The additive compartment 220 may include a partition 222 that may define two discrete additive chambers within the additive compartment 220. For instance, the two discrete additive chambers may be a first additive chamber 224 and a second additive chamber 226. In some embodiments, the first additive chamber 224 is provided to hold laundry detergent such as liquid laundry detergent or powder laundry detergent. Additionally, in some embodiments, the second additive chamber 226 is provided to hold liquid bleach or other specialty additives, e.g., fabric softener, laundry sanitizer, etc. Further, the additive dispenser 200 may also include a first additive tank 228 and a second additive tank 230. The first additive tank 228 may define a third additive chamber 232 therein. The second additive tank 230 may define a fourth additive chamber 234 therein. The first additive tank 228 and the second additive tank 230 may be provided to hold additional additives, for example, fabric softener, additional laundry detergent, laundry sanitizer, etc.

Figure 4:
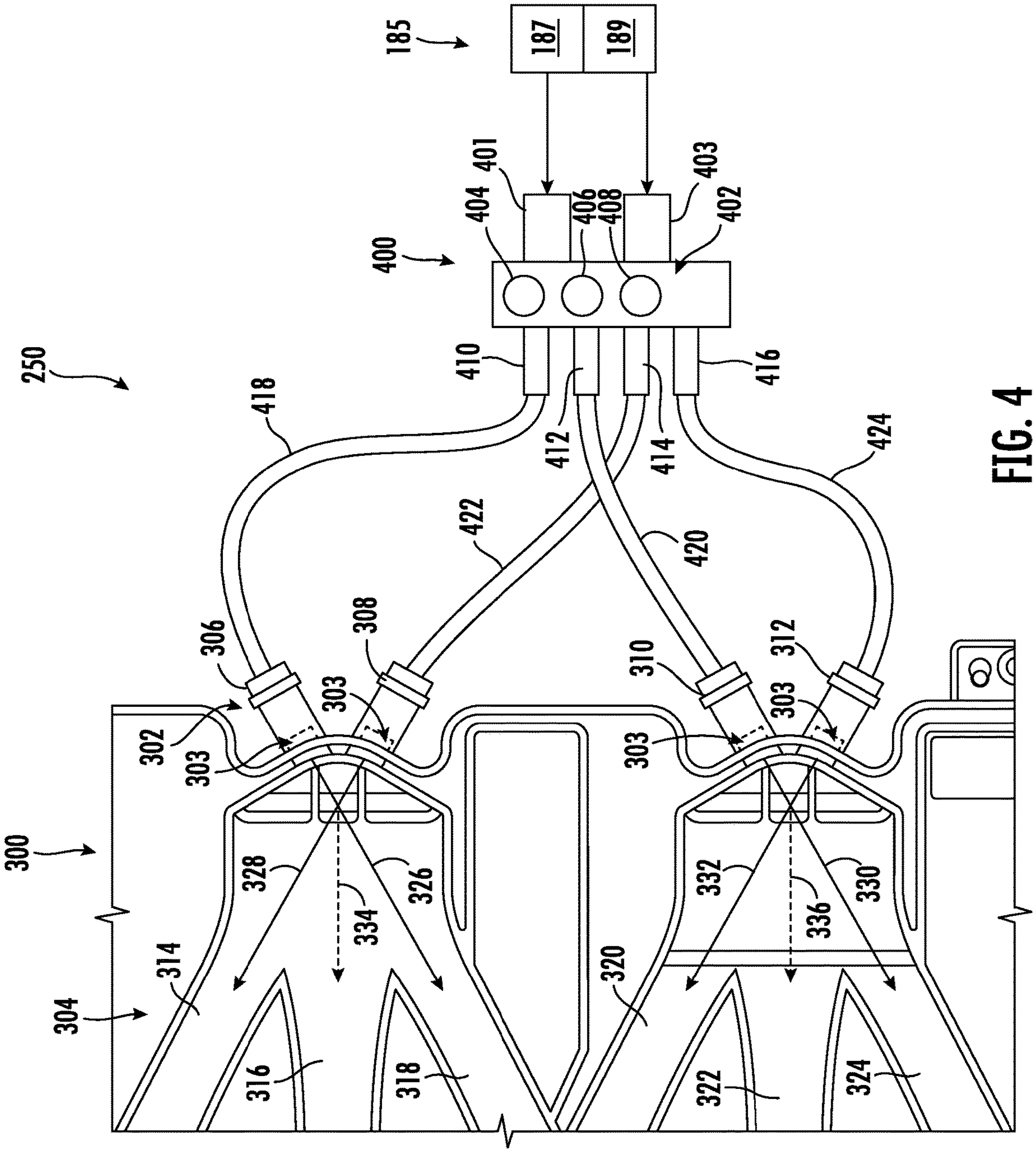
FIG. 4 provides a plan view of an exemplary water jet system according to one or more exemplary embodiments of the present subject matter.

Referring now to FIG. 4, a plan view of a water jet system 250 according to one or more exemplary embodiments of the present subject matter is provided. The water jet system 250 may generally include a flow channel manifold 300 and a water valve manifold 400. The water valve manifold 400 may be in upstream fluid communication with the flow channel manifold 300. In some embodiments, the flow channel manifold 300 may be positioned within the cabinet 102. Additionally, the flow channel manifold 300 may be in upstream fluid communication with additive dispenser 200. In this regard, the flow channel manifold 300 may be configured to direct clean water to the additive dispenser 200.

The water valve manifold 400 may be attached to, or may be in fluid communication with, the water source 185. In some embodiments, the water source 185 includes a hot-water source 187 (e.g., a hot water heater appliance) and a cold-water source 189 (e.g., a municipal water network or well). The water valve manifold 400 may be configured to receive hot water from the hot-water source 187 and cold water from the cold-water source 189. For instance, the water valve manifold 400 may generally include a hot-water inlet nozzle 401 connected to the hot-water source 187 and a cold-water inlet nozzle 403 connected to the cold-water source 189. The water valve manifold 400 may also include a plurality of fluid-parallel water valves 402 that may selectively direct water to the flow channel manifold 300. The plurality of fluid-parallel water valves 402 may generally include or be provided as electronic (e.g., electrically controlled) valves and include a solenoid or corresponding valve motor to move a particular valve 402 between open and closed positions, as would be understood. Particularly, the plurality of fluid-parallel water valves 402 may include a first water valve 404, a second water valve 406, and a third water valve 408.

The first water valve 404 may generally be in downstream fluid communication with the hot-water inlet nozzle 401. In this regard, the first water valve 404 may generally be configured to receive and direct hot water from the hot-water source 187. Additionally, the second water valve 406 and the third water valve 408 may be in downstream fluid communication with the cold-water inlet nozzle 403. In this regard, the second water valve 406 and the third water valve 408 may each be configured to receive and direct cold water from the cold-water source 189.

In some embodiments, for instance, as illustrated in FIG. 4, the first water valve 404 includes a first outlet nozzle 410 mounted thereto. The second water valve 406 may include a second outlet nozzle 412 mounted thereto. The third water valve 408 may include a third outlet nozzle 414 and a fourth outlet nozzle 416 mounted to the third water valve 408. The first outlet nozzle 410 may define a first outlet (not depicted) that may be configured to direct a first flow of water from the first water valve 404. The second outlet nozzle 412 may define a second outlet (not depicted) that may be configured to direct a second flow of water from the second water valve 406. The third outlet nozzle 414 may define a third outlet (not depicted) that may be configured to direct a third flow of water from the third water valve 408. The fourth outlet nozzle 416 may define a fourth outlet (not depicted) that may direct a fourth flow of water from the third water valve 408.

As should be appreciated, the third outlet nozzle 414 and the fourth outlet nozzle 416 physically split a single flow of water that may be directed from the third water valve 408. For example, the third outlet nozzle 414 and the fourth outlet nozzle 416 may physically split the single flow of water into two separate flows of water (e.g., the third flow of water and the fourth flow of water). The third outlet nozzle 414 and the fourth outlet nozzle 416 may be configured in any suitable manner such that the flow of water directed from the third water valve 408 may be physically split at the water valve manifold 400. For example, a diverter plate may be positioned in fluid communication between the third water valve 408 and the third outlet nozzle 414 and the fourth outlet nozzle 416. As another example, the third outlet nozzle 414 and the fourth outlet nozzle 416 may be configured as bifurcated nozzles that physically split the flow of water from the third water valve 408.

As should be appreciated, the third flow of water that may be directed by the third outlet nozzle 414 and the fourth flow of water that may be directed by the fourth outlet nozzle 416 may have flow rates that are approximately the same. In this regard, the third outlet nozzle 414 and the fourth outlet nozzle 416 may evenly split the single flow of water from the third water valve 408.

Additionally or alternatively, in some embodiments, the water jet system 250 may include two or more outlet nozzles in downstream fluid communication with each water valve of the plurality of fluid-parallel water valves 402. In this regard, in such embodiments, a flow of water directed from each water valve may, additionally, or alternatively, be physically split into two or more discrete flows of water. For example, in some exemplary embodiments, two outlet nozzles may be in downstream fluid communication with the first water valve 404 such that the flow of water directed from the first water valve 404 is physically split at the water valve manifold 400. As another example, in some exemplary embodiments, two outlet nozzles may be in downstream fluid communication with the second water valve 406 such that the flow of water directed from the first water valve is physically split at the water valve manifold 400. As should be appreciated, in such embodiments, the water jet system 250 may include additional water jet nozzles in downstream fluid communication with each outlet nozzle of the water jet system 250.

Further, the water jet system 250 may also include a plurality of water conduits that are in fluid communication between the water valve manifold 400 and a plurality of water jet nozzles 302 of the flow channel manifold 300. The plurality of water conduits may include a first water conduit 418, a second water conduit 420, a third water conduit 422, or a fourth water conduit 424. The plurality of water jet nozzles 302 may include a first water jet nozzle 306, a second water jet nozzle 308, a third water jet nozzle 310, or a fourth water jet nozzle 312.

In some embodiments, the first water conduit 418 is in fluid communication between the first outlet nozzle 410 and the first water jet nozzle 306. In this regard, the first water conduit 418 may be configured to direct or guide the first flow of water from the first outlet nozzle 410 to the first water jet nozzle 306. In addition, the second water conduit 420 is in fluid communication between the second outlet nozzle 412 and the third water jet nozzle 310. In this regard, the second water conduit 420 may be configured to direct or guide the second flow of water from the second outlet nozzle 412 to the third water jet nozzle 310. Further, in some embodiments, the third water conduit 422 is in fluid communication between the third outlet nozzle 414 and the second water jet nozzle 308. In this regard, the third water conduit 422 may be configured to direct or guide the third flow of water from the third outlet nozzle 414 to second water jet nozzle 308. In addition, the fourth water conduit 424 is in fluid communication between the fourth outlet nozzle 416 and the fourth water jet nozzle 312. In this regard, the fourth water conduit 424 may be configured to direct or guide the fourth flow of water from the fourth outlet nozzle 416 to fourth water jet nozzle 312.

Each water jet nozzle of the plurality of water jet nozzles 302 may be configured to produce a water jet, e.g., a high-pressure flow of water. For instance, each water jet nozzle of the plurality of water jet nozzles 302 may include a small orifice or opening defined therethrough. A flow of water from the respective water conduit may be forced through the small opening or orifice. Thus, a focused and powerful flow of water (e.g., a water jet) may be produced by the water jet nozzle. For example, the first water jet nozzle 306 may be configured to produce a first water jet 326, the second water jet nozzle 308 may be configured to produce a second water jet 328, the third water jet nozzle 310 may be configured to produce a third water jet 330, and the fourth water jet nozzle 312 may be configured to produce a fourth water jet 332. Further, a conflux, e.g., merging or flowing together, of the first water jet 326 and the second water jet 328 may produce a fifth water jet 334. Additionally, a conflux of the third water jet 330 and the fourth water jet 332 may produce a sixth water jet 336.

Each water jet produced (e.g., directly, or indirectly) by the plurality of water jet nozzles 302 may be directed or routed to the additive dispenser 200 or the tub 114. For instance, the flow channel manifold 300 may include a plurality of fluid-parallel flow channels 304 that are configured to direct each water jet produced (e.g., directly, or indirectly) by the plurality of water jet nozzles 302. For example, the plurality of fluid-parallel flow channels 304 may be in fluid communication between the plurality of water jet nozzles 302 and the additive dispenser 200 or the tub 114. The plurality of fluid-parallel flow channels 304 may include a first flow channel 314, a second flow channel 316, a third flow channel 318, a fourth flow channel 320, a fifth flow channel 322, or a sixth flow channel 324.

Figure 5:
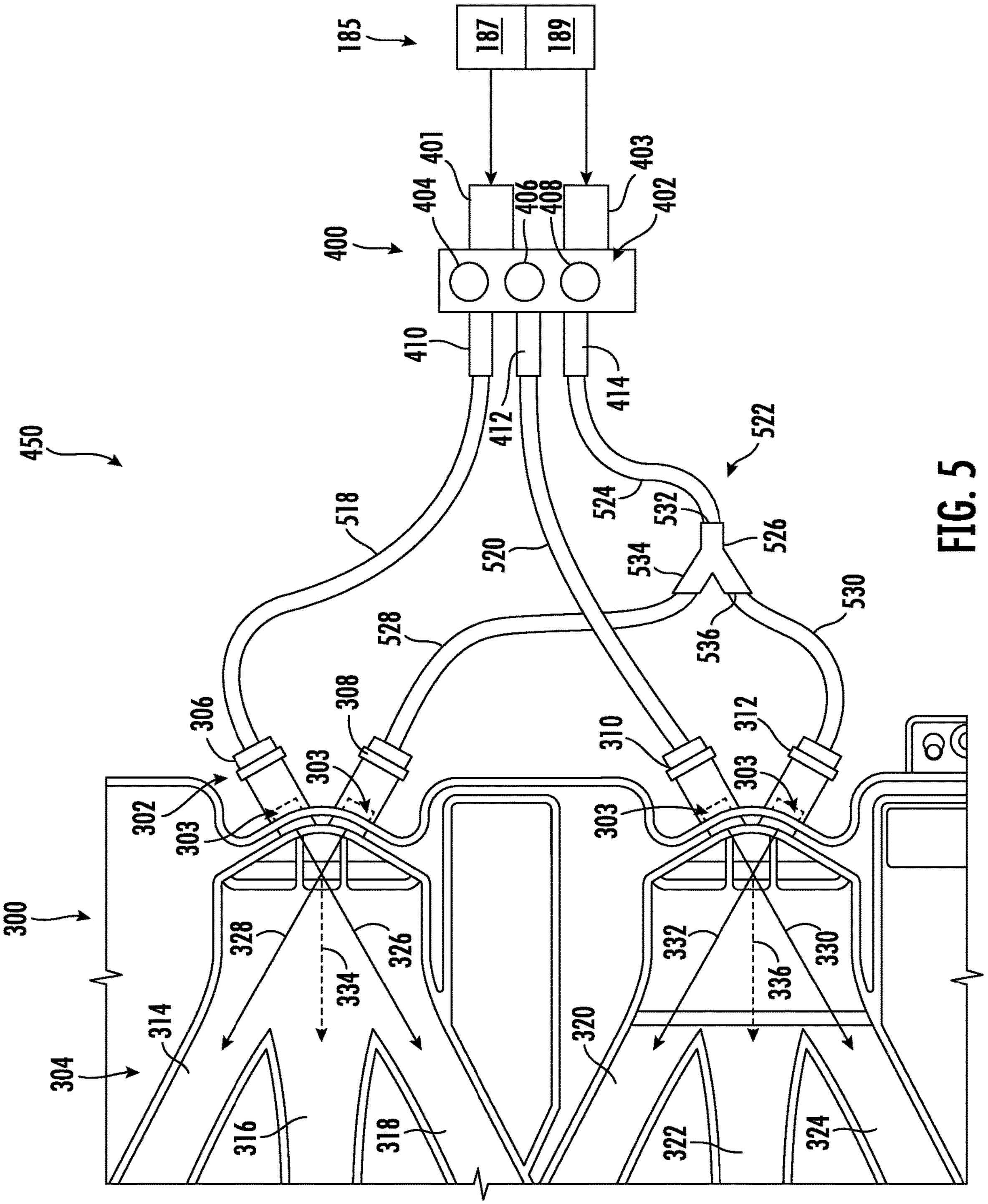
FIG. 5 provides a plan view of another exemplary water jet system according to one or more exemplary embodiments of the present subject matter.

Referring now to FIG. 5, a plan view of a water jet system 450 that may be incorporated into a washing machine appliance, such as the washing machine appliance 100, according to one or more exemplary aspects of the present subject matter is provided. The exemplary water jet system 450 may be configured in substantially the same manner as the exemplary water jet system 250 of FIG. 4, and accordingly, the same or similar numbers may refer to the same or similar parts.

For example, the exemplary water jet system 450 of FIG. 5 generally includes a flow channel manifold 300 and a water valve manifold 400. However, for the embodiment of FIG. 5, the water valve manifold 400 may not include the fourth outlet nozzle 416. For instance, only the third outlet nozzle 414 may be mounted to the third water valve 408. Moreover, for the embodiment of FIG. 5, a first water conduit 518 may be in fluid communication between the first outlet nozzle 410 and the first water jet nozzle 306. A second water conduit 520 may be in fluid communication between the second outlet nozzle 412 and the third water jet nozzle 310. A third water conduit 522 may be in fluid communication between the third outlet nozzle 414 and the second water jet nozzle 308. Additionally or alternatively, the third water conduit 522 may be in fluid communication between the third outlet nozzle 414 and the fourth water jet nozzle 312.

Particularly, the third water conduit 522 may physically split a single flow of water that may be directed from the third outlet nozzle 414 into a third flow of water and a fourth flow of water. For instance, the third water conduit 522 may include a main conduit 524, a Y connector 526, a first branch conduit 528, and a second branch conduit 530. The Y connector 526 may include an inlet 532, a first outlet 534, and a second outlet 536.

In some embodiments, the main conduit 524 is in fluid communication between the third outlet nozzle 414 and the inlet 532 of the Y connector 526. In this regard, the Y connector may be configured to physically split a flow of water directed from the third outlet nozzle 414. Specifically, the Y connector may be configured to evenly split the flow of water directed from the third outlet nozzle 414. In this regard, the Y connector is configured to direct the third flow of water through the first outlet 534 and the fourth flow of water through the second outlet 536. Further, in some embodiments, the first branch conduit 528 is in fluid communication between the first outlet 534 and the second water jet nozzle 308. In addition, in some embodiments, the second branch conduit 530 is in fluid communication between the second outlet 536 of the Y connector and the fourth water jet nozzle 312.

The exemplary water jet systems, e.g., the water jet system 250 or the water jet system 450, may advantageously be capable of producing water jets that perform five independent functions for the washing machine appliance 100 using only three water valves, e.g., the first water valve 404, the second water valve 406, and the third water valve 408. For example, the exemplary water jet systems may produce one or more water jets that are configured to fill the tub 114 with hot water, fill the tub 114 with cold water, and flush three discrete additive chambers within the additive dispenser 200, e.g., three of the first additive chamber 224, the second additive chamber 226, the third additive chamber 232, or the fourth additive chamber 234.

For example, the first water jet nozzle 306 may produce the first water jet 326. The first water jet 326 may be directed through the third flow channel 318. In some embodiments, the third flow channel 318 may be in fluid communication with the tub 114. For instance, the third flow channel 318 may be in direct fluid communication with the tub 114 such that the first water jet 326 may provide clean water, e.g., water from the water source 185 that has not been mixed with an additive, such as an additive that may be held within the additive dispenser 200, to the tub 114. More particularly, the first water jet nozzle 306 may be utilized to provide or direct hot water to the tub 114. For instance, as the first water jet nozzle 306 is in downstream fluid communication with the hot water source 187, the first water jet 326 produced may be a flow of hot water.

The second water jet nozzle 308 may produce the second water jet 328. The second water jet 328 may be directed through the first flow channel 314. In some embodiments, the first flow channel 314 may be in fluid communication with the tub 114. For instance, the first flow channel 314 may be in direct fluid communication with the tub 114 such that the second water jet 328 may provide clean water to the tub 114. More particularly, the second water jet nozzle 308 may provide or direct cold water to the tub 114. For instance, as the second water jet nozzle 308 is in downstream fluid communication with the cold-water source 189, the second water jet 328 produced may be a flow of cold water.

The third water jet nozzle 310 may produce the third water jet 330. The third water jet 330 may be directed through the sixth flow channel 324. In some embodiments, the sixth flow channel 324 may be in fluid communication with the additive dispenser 200. For instance, the sixth flow channel 324 may be utilized to provide clean water to a discrete chamber of the additive dispenser 200, e.g., to flush an additive from the discrete additive chamber. Thus, a wash fluid may be formed and directed to the tub 114. The third water jet nozzle 310 may provide or direct cold water to additive dispenser 200. For instance, as the third water jet nozzle 310 is in downstream fluid communication with the cold-water source 189, the third water jet 330 produced may be a flow of cold water.

The fourth water jet nozzle 312 may produce the fourth water jet 332. The fourth water jet 332 may be directed through the fourth flow channel 320. In some embodiments, the fourth flow channel 320 may be in direct fluid communication with the tub 114. For example, the fourth flow channel 320 may be utilized to provide clean water to the tub 114. Further, the fourth water jet nozzle 312 may provide or direct cold water to the tub 114. For instance, as the fourth water jet nozzle 312 is in downstream fluid communication with the cold-water source 189, the fourth water jet 332 produced may be a flow of cold water.

The conflux, e.g., the flowing together, of the first water jet 326 and the second water jet 328 may produce the fifth water jet 334 that may be directed through the second flow channel 316. In some embodiments, the second flow channel 316 may be in fluid communication with the additive dispenser 200. For example, the second flow channel 316 may be utilized to direct clean water, e.g., the fifth water jet 334, to a discrete chamber of the additive dispenser 200. In this regard, the fifth water jet 334 may be capable of flushing the additive from the additive chamber, e.g., to form a wash fluid that may be dispensed into the tub 114. Further, the first water jet nozzle 306 may produce a flow of hot water and the third water jet nozzle 310 may produce a flow of cold water. In this regard, the fifth water jet 334 may be a thermal blend of the first water jet 326 and the second water jet 328.

The conflux of the third water jet 330 and the fourth water jet 332 may produce the sixth water jet 336 that may be directed through the fifth flow channel 322. In some embodiments, the fifth flow channel 322 may be in fluid communication with the additive dispenser 200. For example, the fifth flow channel 322 may be utilized to provide, or direct, clean water, e.g., the sixth water jet 336, to a discrete chamber of the additive dispenser 200. In this regard, the sixth water jet 336 may be capable of flushing the additive from the additive chamber, e.g., to form a wash fluid that may be dispensed into the tub 114. Further, the third water jet nozzle 310 may provide or direct cold water and the fourth water jet nozzle 312 may provide or direct cold water. In this regard, the sixth water jet 336 may provide or direct cold water.

As should be appreciated, each water jet produced by the plurality of water jet nozzles 302 may define an independent flow rate. During operation of the water jet system 250 in order for the fifth water jet 334, e.g., the conflux of the first water jet 326 and the second water jet 328, to be directed to the second flow channel 316, a flow rate of the first water jet 326 and a flow rate of the second water jet 328 may be approximately the same. Similarly, in order for the sixth water jet 336, e.g., the conflux of the third water jet 330 and the fourth water jet 332, to be directed to the fourth flow channel 320, a flow rate of the third water jet 330 and a flow rate of the fourth water jet 332 may be approximately the same. However, when the flow of water directed from the third water valve is physically split, flow rates of the water downstream, e.g., within the third conduit and the fourth conduit, may be lowered.

Accordingly, embodiments of the present subject matter may also provide systems and methods advantageously may adjust one or more flow rates of the one or more flows of water that may be directed to or from the plurality of water jet nozzles 302. For instance, the flow rate of the flow of water directed from the third water valve may be increased or the flow rate of the flow of water directed from the first water valve and the second water valve may be decreased.

Moreover, in some embodiments, each water jet nozzle of the plurality of water jet nozzles 302 may include a vent 303 defined therethrough. For example, in some embodiments, each vent 303 may define an opening (depicted in phantom) at a bottom side of each water jet nozzle of the plurality of water jet nozzles 302. Each vent 303 may be in operative communication with the controller 180. In this regard, during operation of the exemplary water jet systems (e.g., water jet system 250 or water jet system 450), the vent 303 may be selectively opened such that the flow rate of the water passing through the respective water jet nozzle may be regulated.

Embodiments of the present subject matter may advantageously reduce or minimize the number of water valves that may be utilized by washing machine appliance via a flow arrangement of the washing machine appliance. For example, embodiments of the present subject matter may advantageously provide a flow arrangement that utilizes three discrete water valves to perform five independent functions, such as hot water fill, cold water fill, and flushing of three additional additive chambers. The flow arrangement may advantageously split one of the three valves into two branches, e.g., by utilizing a "Y" connector or a manifold. These branches may be coupled with nozzles of the washing machine appliance that may advantageously combine flows such that the flows may be directed to desired locations within an additive dispenser of the washing machine appliance. Additionally, embodiments of the present subject matter may advantageously reduce uneven flow issue (while splitting the water flow) and optimize flow rates.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance comprising:

a cabinet;

a tub positioned in the cabinet;

an additive dispenser upstream of the tub, the additive dispenser defining a plurality of additive chambers therein;

a flow channel manifold positioned within the cabinet and upstream of the additive dispenser and of the tub, the flow channel manifold comprising a plurality of water jet nozzles and a plurality of flow channels, the plurality of flow channels in downstream fluid communication with the plurality of water jet nozzles, the plurality of water jet nozzles comprising a first water jet nozzle, a second water jet nozzle, a third water jet nozzle, and a fourth water jet nozzle, the plurality of flow channels comprising a first flow channel, a second flow channel, a third flow channel, a fourth flow channel, a fifth flow channel, and a sixth flow channel; and a water valve manifold comprising a plurality of fluid-parallel water valves to selectively direct water to the plurality of water jet nozzles, the plurality of fluid-parallel water valves comprising a first water valve in upstream fluid communication with the first water jet nozzle, a second water valve in upstream fluid communication with the third water jet nozzle, and a third water valve in upstream fluid communication with the second water jet nozzle and the fourth water jet nozzle.

2. The washing machine appliance of claim 1, wherein the first water valve comprises a first outlet nozzle that defines a first outlet to direct a first flow of water, wherein the second water valve comprises a second outlet nozzle that defines a second outlet to direct a second flow of water, wherein the third water valve comprises a third outlet nozzle and a fourth outlet nozzle, wherein the third outlet nozzle defines a third outlet to direct a third flow of water, and wherein the fourth outlet nozzle defines a fourth outlet to direct a fourth flow of water.

3. The washing machine appliance of claim 2, wherein the water valve manifold further comprises a first water conduit in fluid communication between the first outlet nozzle and the first water jet nozzle, a second water conduit in fluid communication between the second outlet nozzle and the third water jet nozzle, a third water conduit in fluid communication between the third outlet nozzle and the second water jet nozzle, and a fourth water conduit in fluid communication between the fourth outlet nozzle and the fourth water jet nozzle.

4. The washing machine appliance of claim 1, wherein the first water valve comprises a first outlet nozzle that defines a first outlet to direct a first flow of water, wherein the second water valve comprises a second outlet nozzle that defines a second outlet to direct a second flow of water, wherein the third water valve comprises a third outlet nozzle that defines a third outlet to direct a third flow of water.

5. The washing machine appliance of claim 4, further comprising:

a first water conduit in fluid communication between the first outlet nozzle and the first water jet nozzle, a second water conduit in fluid communication between the second outlet nozzle and the third water jet nozzle, and a third water conduit, wherein the third water conduit comprises a main conduit, a Y connector to split the third flow of water, a first branch conduit, and a second branch conduit, wherein the Y connector comprises an inlet, a first outlet, and a second outlet, wherein the main conduit is in fluid communication between the third outlet nozzle and the inlet of the Y connector, wherein the first branch conduit is in fluid communication between the first outlet of the Y connector and the second water jet nozzle, and wherein the second branch conduit is in fluid communication between the second outlet of the Y connector and the fourth water jet nozzle.

6. The washing machine appliance of claim 1, wherein a first water jet is directed to the third flow channel by the first water jet nozzle, wherein a second water jet is directed to the first flow channel by the second water jet nozzle, wherein a third water jet is directed to the sixth flow channel by the third water jet nozzle, wherein a fourth water jet is directed to the fourth flow channel by the fourth water jet nozzle, wherein a fifth water jet is directed to the second flow channel by a conflux of the first water jet and the second water jet, and wherein a sixth water jet is directed to the fifth flow channel by a conflux of the third water jet and the fourth water jet.

7. The washing machine appliance of claim 1, wherein the water valve manifold comprises a hot-water inlet nozzle and a cold-water inlet nozzle, wherein the first water valve is in downstream fluid communication with the hot-water inlet nozzle, and wherein the second water valve and the third water valve are in downstream fluid communication with the cold-water inlet nozzle.

8. The washing machine appliance of claim 1, wherein each water jet nozzle of the plurality of water jet nozzles comprises a vent defining an opening through a bottom side of each water jet nozzle of the plurality of water jets nozzles.

9. The washing machine appliance of claim 8, wherein each vent is in operative communication with a controller of the washing machine appliance, the controller being is operable for:

selectively opening the vent to regulate a flow rate of water passing through the respective water jet nozzle.

10. A washing machine appliance comprising:

a cabinet;

a tub positioned in the cabinet;

an additive dispenser positioned in the cabinet;

a flow channel manifold positioned within the cabinet and upstream of the additive dispenser, the flow channel manifold comprising a plurality of water jet nozzles and a plurality of flow channels, the plurality of water jet nozzles comprising a first water jet nozzle, a second water jet nozzle, and a third water jet nozzle, and a fourth water jet nozzle, the plurality of flow channels in downstream fluid communication with the plurality of water jet nozzles; and a water valve manifold comprising a plurality of water valves comprising a first water valve, a second water valve, and a third water valve, the plurality of water valves configured to selectively direct water to the plurality of water jet nozzles, wherein the first water valve and the second water valve are each in upstream fluid communication with a discrete water jet nozzle of the plurality of water jet nozzles, and wherein the third water valve is in upstream fluid communication with two water jet nozzles of the plurality of water jet nozzles.

11. The washing machine appliance of claim 10, wherein the plurality of flow channels comprises a first flow channel, a second flow channel, a third flow channel, a fourth flow channel, a fifth flow channel, and a sixth flow channel.

12. The washing machine appliance of claim 10, wherein the water valve manifold comprises a hot-water inlet nozzle and a cold-water inlet nozzle, wherein the first water valve is in downstream fluid communication with the hot-water inlet nozzle, and wherein the second water valve and the third water valve are in downstream fluid communication with the cold-water inlet nozzle.

13. The washing machine appliance of claim 10, wherein the first water valve comprises a first outlet nozzle that defines a first outlet to direct a first flow of water, wherein the second water valve comprises a second outlet nozzle that defines a second outlet to direct a second flow of water, wherein the third water valve comprises a third outlet nozzle and a fourth outlet nozzle, wherein the third outlet nozzle defines a third outlet to direct a third flow of water, and wherein the fourth outlet nozzle defines a fourth outlet to direct a fourth flow of water.

14. The washing machine appliance of claim 13, wherein the water valve manifold further comprises a first water conduit in fluid communication between the first outlet nozzle and the first water jet nozzle, a second water conduit in fluid communication between the second outlet nozzle and the third water jet nozzle, a third water conduit in fluid communication between the third outlet nozzle and the second water jet nozzle, and a fourth water conduit in fluid communication between the fourth outlet nozzle and the fourth water jet nozzle.

15. The washing machine appliance of claim 14, further comprising:

a first water conduit in fluid communication between the first outlet nozzle and the first water jet nozzle, a second water conduit in fluid communication between the second outlet nozzle and the third water jet nozzle, and a third water conduit, wherein the third water conduit comprises a main conduit, a Y connector to split the third flow of water, a first branch conduit, and a second branch conduit, wherein the Y connector comprises an inlet, a first outlet, and a second outlet, wherein the main conduit is in fluid communication between the third outlet nozzle and the inlet of the Y connector, wherein the first branch conduit is in fluid communication between the first outlet of the Y connector and the second water jet nozzle, and wherein the second branch conduit is in fluid communication between the second outlet of the Y connector and the fourth water jet nozzle.

16. The washing machine appliance of claim 10, wherein each water jet nozzle of the plurality of water jet nozzles comprises a vent defining an opening through a bottom side of each water jet nozzle of the plurality of water jets nozzles.

17. The washing machine appliance of claim 16, wherein each vent is in operative communication with a controller of the washing machine appliance, the controller being is operable for:

selectively opening the vent to regulate a flow rate of water passing through the respective water jet nozzle.

18. The washing machine appliance of claim 10, wherein the additive dispenser is downstream of the flow channel manifold, the additive dispenser defining a plurality of additive chambers therein.

* * * * *